United States Patent [19]

Freud et al.

[11] Patent Number: 4,542,435
[45] Date of Patent: Sep. 17, 1985

[54] PRESSURE TRANSDUCER AND MOUNTING

[75] Inventors: Paul J. Freud; Ronald D. Baxter, both of Furlong; Paul M. Kroninger, Jr., Harleysville, all of Pa.

[73] Assignee: General Signal Corporation, Stamford, Conn.

[21] Appl. No.: 594,588

[22] Filed: Mar. 29, 1984

[51] Int. Cl.$^4$ .......................... H01G 7/00; G01L 9/12
[52] U.S. Cl. ........................................ 361/283; 73/718
[58] Field of Search ........................... 361/283; 73/718

[56]  References Cited

U.S. PATENT DOCUMENTS

| | | | |
|---|---|---|---|
| 4,257,274 | 3/1981 | Shimada et al. | 73/718 |
| 4,424,713 | 1/1984 | Kroninger et al. | 73/718 |
| 4,433,580 | 2/1984 | Tward | 361/283 X |

Primary Examiner—Donald A. Griffin
Attorney, Agent, or Firm—Harold Huberfeld; William G. Miller, Jr.

[57]  ABSTRACT

A capacitive pressure transducer whose diaphragm is formed of single crystal, highly doped silicon by etching in opposite sides the recesses which define the deflecting region of the diaphragm. This deflecting region serves as one electrode of the transducer. Two support plates of silicon are anodically bonded to opposite sides of the diaphragm along its periphery using thin layers of borosilicate glass to form with the etched recesses pressure receiving cavities. These thin layers of borosilicate glass are interposed between the diaphragm and a support plate, and extend over the entire surface of the support plate facing the diaphragm to provide for electrical isolation as well as the bonding between the diaphragm and the support plates. These layers of glass are made as thin as possible consistent with the need to maintain the stray capacitance below a certain value.

The transducer is mounted to a pressure receiving assembly by using a silicon stub having a passage for communicating one pressure to be measured to the transducer. The stub is joined at one end to the transducer by anodic bonding using a thin layer of borosilicate glass. A weldable tube is attached to the stub. This tube is long with respect to the stub and has a reduced diameter at one end which fits into the passage of the stub. The reduced diameter is kept at a minimum. The tube is welded to the pressure receiving body at its end to provide mechanical isolation for the transducer.

6 Claims, 5 Drawing Figures

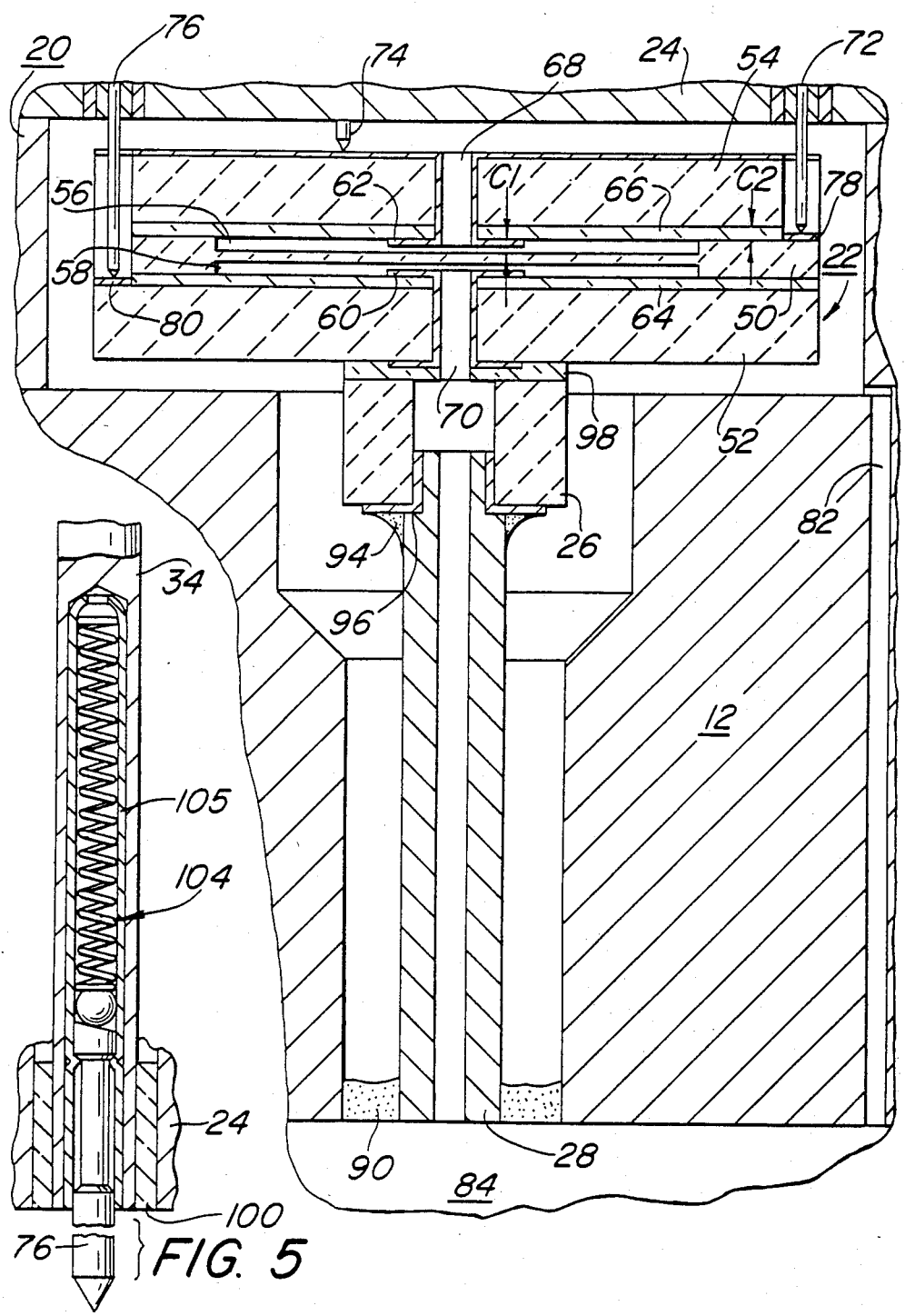

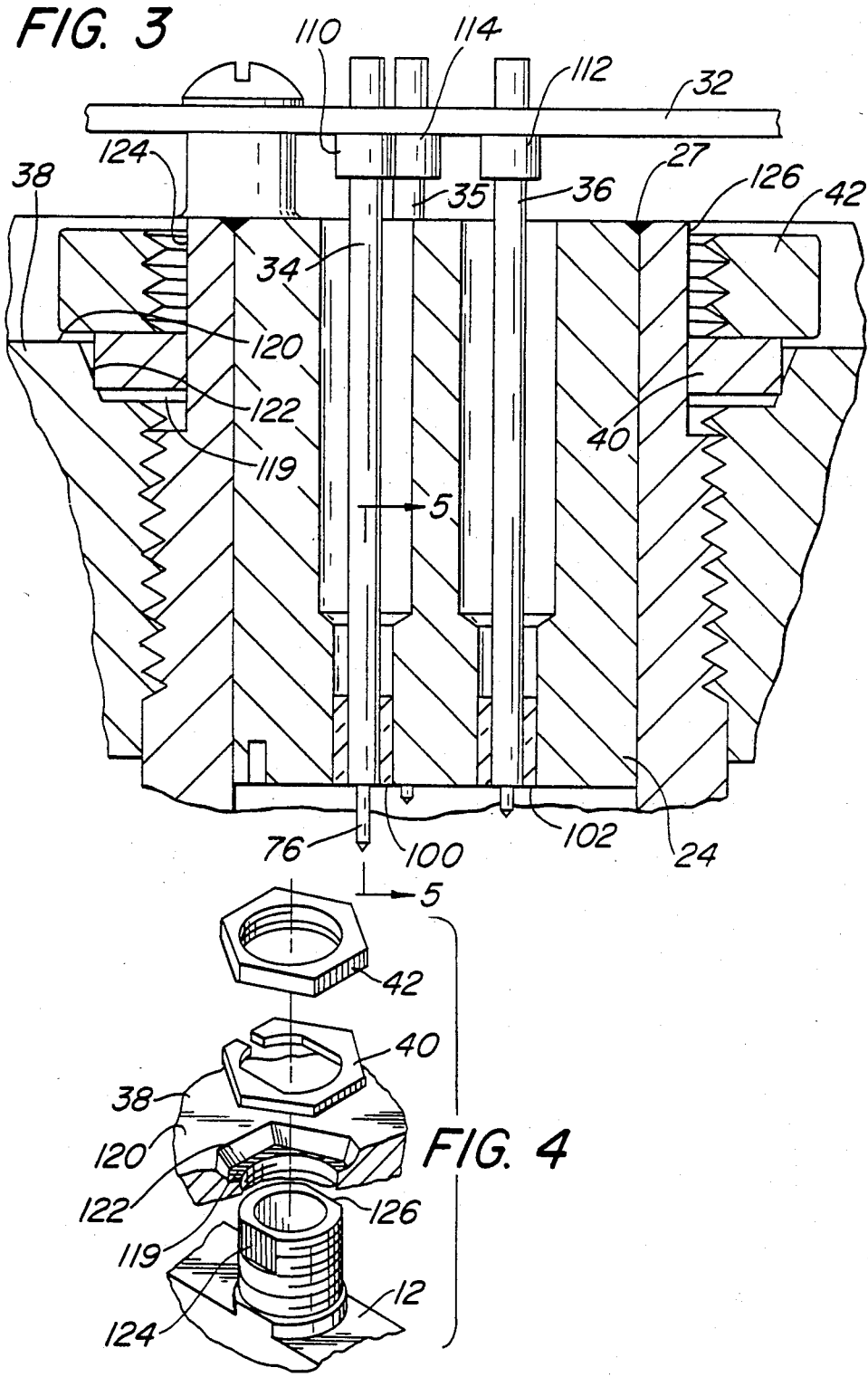

PRESSURE TRANSDUCER AND MOUNTING

BACKGROUND OF THE INVENTION

The present invention relates to a pressure transducer for sensing a pressure or a differential pressure, and more particularly to a pressure transducer of the capacitive type which utilizes a single crystal of silicon etched to form a diaphragm as one electrode of the transducer with other silicon plates mounted parallel to it to carry other fixed electrodes. The present invention also relates to means for mounting pressure transducers of this type.

Pressure transducers of the type described above are subject to changes in calibration, both in zero and span, when there is a change in the dimensions of the parts of the transducer and/or the mounting structure such as may result from changes in the temperature or the hydrostatic pressure of the medium surrounding the transducer and its mounting. These changes in dimension may cause a distortion of the shape of the transducer so as to distort the diaphragm and cause a change in the zero of the transducer calibration. However, even if the nature of the structure is such that distortion is avoided, changes may occur in the linear dimensions so that the transducer diaphragm is subjected to a change in radial stress causing a change in the span of the transducer calibration. These effects may, of course, combine so that there is both a distortion of shape causing a change in the zero and a change in linear dimensions causing a change in the span. Both effects are, of course, particularly noticeable when the transducer is used to measure small pressure differentials in a line operating at a high pressure with wide temperature swings, as will frequently occur in industrial processes. For example, it may be necessary to measure a 1 psi differential in a line at 10,000 psi with temperature swings amounting to something on the order of 100° F.

Pressure transducers using silicon diaphragms as described above are shown in U.S. Pat. No. 4,257,274 where FIGS. 4 and 6 show capacitive pressure transducers having etched silicon diaphragms mounted between silicon plates with the spacing between the diaphragm and the plates being determined by borosilicate glass spacer rings. These rings serve to provide the necessary electrical isolation between the diaphragm and the plates as well as the material necessary for anodically bonding the plates to the diaphragm. This reference does not disclose any means for minimizing the effects of changes in temperature or hydrostatic pressure. In addition the structure of the disclosed transducer is such that it would be difficult to accurately predetermine the spacing between the diaphragm and the plates, for the glass spacer could not be accurately dimensioned without using expensive procedures of manufacture. This spacing is very important in capacitive transducers.

Another pressure transducer using a silicon diaphragm is shown in U.S. Pat. No. 4,364,276. This transducer is not of the capacitive type, but instead is of the type which uses a vapor deposition or a diffusion type strain gauge on the diaphragm to provide the pressure measurement. This transducer, however, is of interest since it describes a mounting means alledgedly designed to minimize the effects of Young's modulus on the pressure measurement. In this patent, FIG. 6, for example, shows a silicon diaphragm mounted on a thin glass washer which is in turn mounted on a metal support member having a Young's modulus which is substantially equal to that of silicon. The patentee states that the strain produced in the diaphragm due to the differences in the Young's modulus of glass and silicon can be minimized by this structure. It is evident from this disclosure that the patentee was only attempting to prevent the distortion of the diaphragm to avoid changes in the zero with changes in hydrostatic pressure. No attempt is made to solve the problem of change in the span due to changes in radial stress in the diaphragm as will result from dimension changes alone. The patentee is only attempting to balance the effect of the mounting on one side of the glass washer with the effect of the silicon on the other side so that there will be no net distortion resulting from changes in hydrostatic pressure.

As mentioned above, it is important to accurately determine the spacing between the electrodes of a capacitive pressure transducer during manufacture in a way which is inexpensive and yet one which will cause all of the transducers manufactured to exhibit substantially the same response characteristics. This spacing problem does not exist with strain gauge or other types of transducers. Therefore, the means for minimizing the effects of the elastic moduli on the transducer in the disclosure of U.S. Pat. No. 4,364,276 did not need to minimize variations in spacing.

The problems which arise because of changes in the hydrostatic pressure surrounding the transducer and its mounting result from the use of materials with different elastic moduli. Thus, the borosilicate glass normally used to provide anodic bonding of a silicon diaphragm to silicon electrode support plates creates a problem since its Young's modulus is different from that of the silicon diaphragm and silicon plates. As a result of this difference, an increase in the hydrostatic pressure of the transducer's surroundings will cause a decrease in the volume of each of the individual parts of the transducer subjected to this change in pressure. Normally all of the parts are exposed to this change, including the parts used to provide a firm mounting of the transducer. Since only the change in the radial dimensions of the diaphragm are a cause of trouble, changes in thickness of the diaphragm and the plates need not be considered.

To consider the magnitude and nature of the problem presented by differences in the Young's modulus of the materials of the transducer, it is necessary to consider the pressure-deflection relationship of a clamped and tensioned diaphragm. This relationship is as follows:

$$P = [(16EW_0h^3)/(3(1-v^2)a^4)] + [4T_0W_0h/a^2] \qquad (1)$$

where:
  E = Young's modulus
  v = Poisson's ratio
  h = thickness of the diaphragm
  a = diaphragm radius
  $W_0$ = center of deflection
  $T_0$ = radial stress The first bracketed expression of equation (1) expresses the relationship due to the clamped nature of the diaphragm and the second bracketed expression expresses the relationship due to the fact that the diaphragm is tensioned.

The percent change in the pressure response (span) of the diaphragm due to radial stress in the diaphragm is given by:

$$\% \text{ span shift} = \tfrac{3}{4}(1-v^2)(T_0/E)(a/h)^2 \times 100 \quad (2)$$

In sensors having a symmetrical parallel plate configuration which involves only two different materials (a first material of silicon and a second material of borosilicate glass, for example) such as is shown in FIGS. 4 and 6 of U.S. Pat. No. 4,257,274 and in the present invention, radial stresses in the diaphragm arise due to:

(1) temperature change, if the thermal expansion coefficients differ for the materials, and
(2) hydrostatic pressure change, if the Young's moduli are different.

The stress in the first material due to changes in hydrostatic pressure is given by:

$$T_0 = -[\Delta P(E_1 - E_2)]/[(A_1/A_2)E_1 + E_2] \quad (3)$$

and the stress in the first material due to changes in temperature is given by:

$$T_0 = -[E_1 E_2(\alpha_1 - \alpha_2)\Delta T]/[(A_1/A_2)E_1 + E_2] \quad (4)$$

where:
$E_1$ = Young's modulus of the first material
$E_2$ = Young's modulus of the second material
$\alpha_1$ = thermal expansion coeff. of first material
$\alpha_2$ = thermal expansion coeff. of second material
$\Delta T$ = temperature change
$\Delta p$ = hydrostatic pressure change
$A_1$ = cross sectional area of first material
$A_2$ = cross sectional area of second material Since the outside dimensions of all three plates of the sensor are the same, the area ratio $A_1/A_2$ can be replaced with a corresponding thickness ratio $t_1/t_2$.

It will be evident from an examination of equations (2), (3) and (4) that an equality between the thermal expansion coefficients and the Young's moduli would result in a zero value for the stress $T_0$ and the % span shift. This condition can, of course, be met by using the same material for all components of the transducer and its mounting. Such a solution to the problem is not possible, however, because of the need to bond the layers of the structure together and to isolate electrically the diaphragm from the electrode support plates. Other approaches must therefore be used to solve this problem.

It is an object of this invention to provide a structure for the pressure transducer and its mounting which will make possible the accurate spacing of the electrodes of a capacitive transducer, while at the same time providing substantial insensitivity of both the span and zero of the device to changes in temperature and hydrostatic pressure.

It is a further object of this invention to provide a mounting structure, which will provide substantial mechanical isolation for the transducer.

SUMMARY OF THE INVENTION

To accomplish the above objects, we have found that it is necessary to minimize the thickness of the borosilicate glass between the silicon plates and the silicon diaphragm as much as is possible consistent with keeping the stray capacitance within acceptable limits and to mount the resulting transducer structure in such a way that the weldable material required to securely anchor the transducer is as far as is practicable from the transducer itself, since the weldable materials available do not typically have thermal expansion coefficients and Young's moduli close to those of the silicon plates. We have also found that the mounting structure should be long to mechanically isolate the transducer.

To provide a structure of this type we use a capacitive pressure measuring transducer with a diaphragm member formed of single crystal of highly doped silicon by etching in opposite sides of the diaphragm recesses which define the deflecting region of the diaphragm. This deflecting region also serves as one electrode of the transducer. Two support plates of silicon are anodically bonded to opposite sides of the diaphragm along its periphery using thin layers of borosilicate glass to form with the etched recesses pressure receiving cavities. These plates have pressure communicating passages extending therethrough. The thin layers of borosilicate glass are each interposed between the diaphragm and a support plate, and extend over the entire surface of the support plate facing the diaphragm to provide for electrical isolation as well as the bonding between the diaphragm and the support plates. These glass layers also assure that the spacing between the diaphragm and the metallized regions deposited on the glass surfaces in the cavities is solely a function of the depth of the etched recesses. The metallized regions are opposite the deflecting portion of the diaphragm and act as the fixed electrodes required for the transducer.

A mounting for the transducer is provided by using a silicon stub having a pressure transmitting passage therethrough with the stub joined at one end of the transducer by anodic bonding. The stub may have its other end metallized to accommodate soldering or brazing. The mounting also uses a weldable alloy tube which is long with respect to the stub and has a reduced diameter at one end fitted into the passage of the stub and affixed thereto. The material of the tube is preferably such that its thermal expansion coefficient is close to that of silicon. Thus, the stub may be an Fe-Ni-Co alloy such as Kovar.

BRIEF DESCRIPTION OF THE DRAWINGS

In the drawings, where like reference characters identify like parts:

FIG. 2 is a cross section showing the transducer construction and the means for mounting the transducer.

FIG. 3 is a cross section showing the bulkhead of the transducer assembly and its electrical feedthrough.

FIG. 4 is an exploded view showing details of the anti-rotation locknut arrangement used to prevent rotation of the electronics housing with respect to the pressure receiving body. This view shows the pressure receiving body with the bulkhead removed.

FIG. 5 is a cross section showing details of the spring loaded contacts of the feedthrough in the bulkhead.

DESCRIPTION OF THE PREFERRED EMBODIMENT

Figure 1:
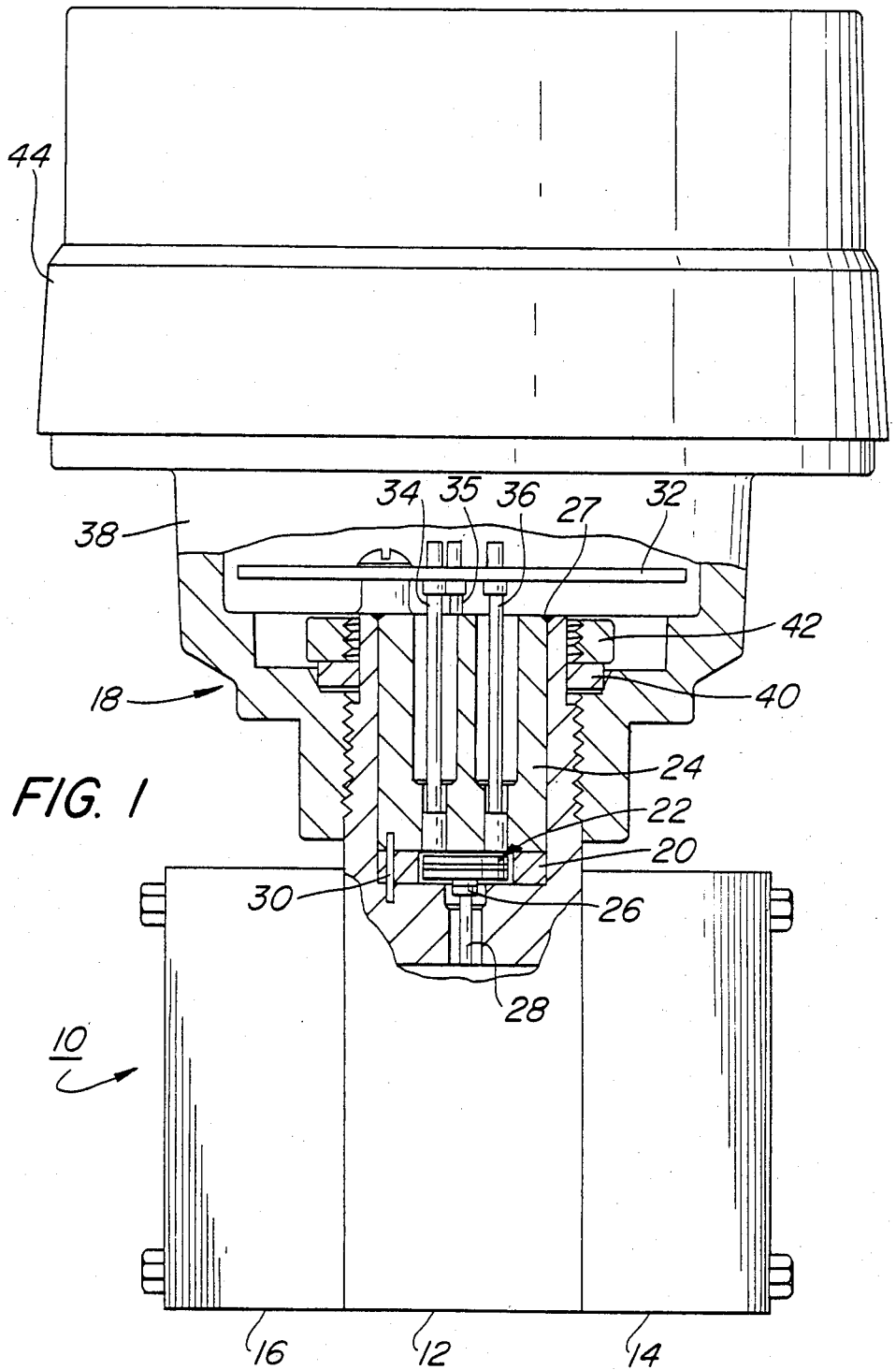
FIG. 1 is a front elevation of a pressure transducer assembly with that part which houses the pressure transducer itself broken away to show the transducer, its mounting, and the electrical feedthrough in cross section.

FIG. 1 is a view, partially in section, of a differential pressure measuring transducer assembly which includes a pressure receiving section 10 having a pressure receiving body 12 which in turn has mounted to it a flange 14 on the high pressure side and a flange 16 on the low pressure side. The pressure receiving body is constructed to accommodate at its pressure receiving end the usual barrier diaphragms, covered by the flanges 14 and 16, as well as high pressure and low pressure receiving chambers and any overprotection means required. Since these elements of the pressure receiving section are well known in the art, and since they form no part of the present invention, they are not shown in FIG. 1 or the other drawings.

The transducer section 18 is shown in cross section in FIG. 1. In this section the pressure measuring end of a stainless steel pressure receiving body 12 is shown having a large bore for accepting a washer shaped spacer 20 which in turn accepts a pressure transducer in its interior. The spacer and transducer are surrounded by a Kovar cylindrical bulkhead forming a feedthrough body 24 which is welded in place to the pressure receiving body 12 at the weld point 27. This weld must be strong enough to withstand the maximum static pressure to which the transducer is to be subjected. The pressure measuring section also includes the transducer 22 and mounting means for securing the transducer to the pressure measuring body 12. This mounting means includes a silicon stub 26 and an alloy mounting tube 28 which has approximately 54% iron, 28% nickel, and 18% cobalt, such as the alloy known as Kovar.

Spacer 20 and feedthrough body 24 are assembled in the proper orientation on the pressure receiving body 12 by means of the locator pin 30.

The electrical connection from a circuit board 32 to the transducer 22 is provided by the electrically conducting rods 34, 35, and 36, which fit in holes in the feedthrough body 24 and are sealed to the feedthrough body by a glass to metal seal at the end of the feedthrough body closest to the pressure transducer. Holes are bored in the ends of the rods nearest the transducer so that those ends will accept spring loaded plunger type contacts which provide the electrical contact to the transducer when the feedthrough is assembled in place.

The measuring section 18 is covered by an electrical housing 38 which is threadably mounted onto a shaft like end of the pressure receiving body 12 and held in place with a locking c-ring 40 and a nut 42. The housing 38 has a cover 44 threaded on it to protect the circuit components and other elements in the housing.

FIG. 2 shows in cross section the details of the pressure transducer and its mounting as well as the manner in which they both fit into the pressure measuring section 18.

The transducer 22 has a silicon diaphragm 50 which has a circular recess etched into its opposite faces to thereby form the deflecting section of the diaphragm. The diaphragm, being of highly doped silicon, is a conductor and also forms one electrode of the transducer. Parallel silicon support plates 52 and 54 are anodically bonded to the opposite sides of the diaphragm along its periphery to thereby form pressure receiving cavities 56 and 58. The anodic bonding requires the use of a nonconductor such as borosilicate glass between the parts to be bonded. The glass will also serve to electrically isolate the diaphragm from the fixed electrodes of the transducer. These fixed electrodes are shown as deposited thin films of metal 60 and 62, which are laid down on the borosilicate glass layers 64 and 66, respectively. It will be noted that the borosilicate glass layers extend over the entire surface of the support plates 52 and 54 opposite the deflecting portion of the diaphragm so that upon deposition of the electrodes 60 and 62 the spacing between those fixed electrodes and the diaphragm is determined solely by the depth of the etched recesses in the diaphragm. This construction creates on each side of the transducer a stray capacitance $C_2$ (through the borosilicate glass) which is in parallel with the transducer capacitance $C_1$. The effect of the stray capacitance, of course, is to reduce the transducer output signal. Therefore, it is desirable to minimize $C_2$ by maximizing the thickness of the borosilicate glass while at the same time minimizing the effects of Young's modulus by minimizing the thickness of the glass. Obviously these two desires are conflicting and it is necessary to determine the thickness of the glass by establishing the desired specifications for the transducer as to span shift.

Each of the support plates has a pressure communicating passage through it. These are shown in FIG. 2 as 68 and 70. These passages are coated with a thick film of metal as is the entire top of plate 54 and a part of the bottom of plate 52 as well as contact pad areas 78 and 80. These metal deposits provide the conductive pads for connecting to the fixed plates 60 and 62 as well as diaphragm 50.

Electrical contact between circuit board 32 by way of feedthrough 24 is provided by the spring contacts 72, 74, and 76, respectively. Contacts 72 and 76 make contact through the conducting pads 78 and 80 which are deposited on the diaphragm and the lower plate, respectively, in the sections of the transducer shown broken away for that purpose.

The transducer 22 is spaced from the body 12 and spacer 20 which is utilized to provide support for the feedthrough body 24 spacing it from the transducer. The spacer 20 has V-grooves in its bottom surface to provide a passage from the high pressure passage 82 for silicone oil which fills the cavities of the transducer assembly. By virtue of these spaces the outside surfaces of the transducer and the high pressure aperture 68 are subjected to the pressures on the high pressure side of the line connected to the high pressure side of the pressure receiving section 10 of FIG. 1. The low pressure side of the pressure receiving section 10 is connected to the aperture 70 by way of a passage through the Kovar alloy tube 28 and the silicon stub 26 which connects with low pressure region 84 of the pressure measuring body 12. It should be noted that since the lower support plate 52 is spaced from the body 12 the only firm connection between the transducer and the body 12 is provided by the weld 90. That weld firmly affixes the tube 28 to the body 12. The top end of the tube 28 has reduced diameter which fits inside the hole in silicon stub 26 and is affixed at the joint 94 as by either soldering, brazing or by the use of epoxy, for example. To accommodate soldering or brazing the silicon stub shown is provided with a metal film on its lower surface and its interior. The stub 26 is anodically bonded to the lower support plate 52 by way of an interposed thin borosilicate glass layer 98 between the stub and the plate.

For the purpose of minimizing the effects of Young's modulus in the mounting structure it is desirable to make the diameter of the tube where it fits into the stub a minimum value and to make the thickness of the glass layer 98 as thin as possible. It is also desirable to make tube 28 as long as possible in order to increase the mechanical isolation of the transducer with respect to the pressure receiving body.

Exemplary dimensions of the elements of the transducer and its mounting are as follows:

diaphragm 50—0.5 in. square and 0.0078 in. thick with recesses 0.0006 in. deep
plates 52,54—0.5 in. square and 0.072 in. thick
glass layers 64,66—thickness of 0.008 in.
glass layer 98—0.006 in. thick
stub 26—0.1 in. high×0.2 in. square
tube 28—0.125 in. dia.×0.3 in. long Using the above transducer dimensions and equations (2), (3), and (4); $A_1/A_2 = 9.5$ and the predicted span shifts for a 1 psi transducer are 0.6%/1000 psi (hydrostatic) and 0.3%/100° F. (temperature). The stray capacitance $C_1$ is approximately 27 picofarads and the active transducer capacitance $C_1$ is 30 picofarads.

FIG. 3 shows in cross section the electrical feedthrough arrangement for making an electrical connection between the electrical circuits on the circuit card 32 and the elements of the transducer 22. Since three connections are required for the present transducer, three holes are drilled in the feedthrough body 24. The rods 34 and 36 are electrical conducting elements shown inserted in two of those holes. These rods are sealed to the circumference of the respective holes by glass pressure seals 100 and 102. The ends of the rods toward the transducer are drilled to provide a hole in the end of each rod of diameter smaller than the rod for a distance less than the length of the rod as required to accommodate spring loaded plunger type contacts 104 and 106 shown inserted in place in the rod 34 in FIG. 5.

As shown in FIG. 5, the contact assembly 104, which is exemplary of the other assemblies, includes a barrel 105 in which there is mounted a coil spring for biasing the contact 76 toward the transducer. The dimensions of the contacts are such that when the feedthrough body 24 is welded in place in the pressure receiving body 12, as shown in FIG. 3, the contacts maintain a complete circuit between the circuit card and the appropriate elements of the transducer. In order that good contact will be made the spring loaded plunger contacts should be gold plated. While the manner in which two of the feedthrough rods are mounted in the body 24 is shown in FIG. 3, it will be understood that the third rod 35 is similarly fitted into the body 24. The benefits derived from using contacts of the above described type include the benefit of having a means for contacting the transducer without taking up much space in the cavity where the transducer is mounted. The cavities of pressure transducers of this type typically are filled with a silicone oil, as previously mentioned. It is desirable to minimize the volume of that oil in order to minimize the effect of the temperature coefficient of the oil and also to minimize the amount of oil available to be compressed when there is a pressure increase in the line. The spring loaded contacts used in this invention are effective in minimizing the volume of oil since most of the contact structure is located inside the feedthrough body itself rather than in the transducer cavity as would be necessary if other spring type contacts were used.

As is also shown in FIG. 3, the rods 34, 35, and 36 are received by spring contacts 110, 112, and 114 in the circuit board 32 so that contact with the circuit is made. The contacts 110, 112, and 114 may be of the type which utilizes coiled springs circling around the interior of their sockets to frictionally engage the inserted rods.

An electrical feedthrough of the type shown in FIG. 3 has certain benefits when constructed as shown. Thus, the arrangement of the three rods 34, 35, and 36 provides a coaxial system in which the conductors are each isolated by a ground plane and a minimum of stray capacitance is present. As shown, contact with the transducer is made without the need to have leads going around the transducer to the bottom. This keeps the volume of the silicone oil to a minimum. Also, the contact points on the transducer are kept as far as possible from the deflecting area of the diaphragm to reduce the effects of the forces transmitted by the contact arrangement.

It should be noted that the feedthrough body is made of the Fe—Ni—Co alloy known as Kovar and is dimensioned so that with changes in temperature the stainless steel body 12 and the feedthrough body 24 have thermal expansions that are such that there is a change in the spacing between the two, below the weld 27, such that it is substantially equal to the change in volume of the silicone oil resulting from the temperature change or provides part of the compensation for such a change in volume. This compensation may, of course, be shared with other parts of the transducer assembly, such as may be found in the pressure receiving section of the assembly.

FIG. 3 also shows in cross section the locking assembly which is used to keep the housing 38 from being rotatable with respect to the pressure receiving body 12 to which it is threadably engaged. An exploded view is shown in FIG. 4. It will be noted that the housing surface 120, which is to be mounted on the threaded pressure receiving body 12, has a recess 119 around its threaded hole. The recess has tapered sides 122 which have a geometric shape or profile in the plane of the housing surface which will resist rotation. Thus, the shape should be non-circular. It may, for example, have one flat side. Preferably the recess has many flat sides. It can, therefore, be hexagonal in configuration, as shown.

The threaded end of the pressure receiving body 12 has opposing parallel flats or relief surfaces 124 and 126. A locking c-ring 40 is constructed to have a slot providing an open end to a central aperture which fits over the flat surfaces so that any rotation of the ring will cause a rotation of the body 12. The outer periphery of the ring has a profile of geometry to match that of the recess sides 122 except that the sides of the ring are straight, that is they are not tapered as are the recess sides. The dimensions of the ring are such that the straight sides of the ring engage the tapered sides of the recess, as shown in FIG. 3. Preferably the ring is made of harder material than the housing 38.

After the housing 38 is threaded onto the end of body 12 it must be backed off a small amount to a point where the ring can be slipped over the end of body 12 and fit in the housing recess 119. Then the nut 42 is threaded onto the body 12 and is tightened. As the nut is tightened the tapered sides of the recess 119 cause the sides of the ring to cam over the sides of the recess. This causes the ring 40 to be elastically deformed so as to grasp the flats 124 and 126 after which the ring bites into the tapered sides 122 of the recess 119 plastically deforming the tapered sides 122, as shown. This causes the fit of the ring in the recess to be so tight that there will not be any rotation of the housing with respect to the pressure receiving body 12. The purpose of this locking assembly is to prevent a rotation of parts such as the circuit board 32 with respect to the rods 34, 35, and 36 which the board contacts. This problem with rotation can arise without there being any intent on the part of the user of the transducer assembly to rotate the housing. The rotation can, for example, occur when conduit is being connected to the housing during installation.

With the present arrangement even the application of larger than normal rotational forces on the housing will not damage the assembly.

What is claimed is:

1. A capacitive pressure measuring transducer comprising:
    a diaphragm member formed of a single crystal of silicon by etching into both sides of said diaphragm recesses defining the deflecting region of said diaphragm;
    a pair of support plates of silicon anodically bonded to opposite sides of said diaphragm along the periphery of said defecting region and having pressure communicating passages extending therethrough;
    a thin layer of borosilicate glass interposed between said diaphragm and each of said support plates and extending over the entire surface of said support plates facing said diaphragm member to form pressure receiving cavities with said diaphragm recesses and to provide for electrical isolation and bonding between said diaphragm and said support plates, said layers being as thin as possible consistent with adequate bonding, acceptable stray capacitance and electrical isolation between said diaphragm and said plates; and
    a metallized region deposited on the surface of each of said glass layers opposite the deflecting region of said diaphragm to form on opposing sides of said diaphragm variable capacitors whose capacitances change in opposite sense with changes in the pressure being measured.

2. A capacitive pressure measuring transducer comprising:
    a diaphragm member formed of a single crystal of highly doped silicon by etching into both sides of said diaphragm recesses defining the deflecting region of said diaphragm;
    a pair of support plates of highly doped silicon anodically bonded to opposite sides of said diaphragm along the periphery of said defecting region and having pressure communicating passage extending therethrough;
    a thin layer of borosilicate glass interposed between said diaphragm and each of said support plates and extending over the entire surface of said support plates facing said diaphragm member to form pressure receiving cavities with said diaphragm recesses and to provide for electrical isolation and bonding between said diaphragm and said support plates, said layers being as thin as possible consistent with adequate bonding, acceptable stray capacitance, and electrical isolation between said diaphragm and said plates;
    a metallized region deposited on the surface of each of said glass layers opposite the deflecting region of said diaphragm to form on opposing sides of said diaphragm variable capacitors whose capacitances change in opposite sense with changes in the pressure being measured; and
    metallized surfaces on the same side of said plates and said diaphragm to provide contact surfaces for an electrical feedthrough using spring biased contacts all oriented on the same side of said transducer.

3. A capacitive pressure measuring transducer and mounting therefore comprising:
    a diaphragm member formed of a single crystal of silicon by etching in each side of said diaphragm a recess defining the deflecting region of said diaphragm, said diaphragm serving as one electrode of said transducer;
    a pair of support plates of silicon anodically bonded on opposite sides of said diaphragm to the peripheral portions of said diaphragm so that said recesses form with said plates pressure receiving cavities, said support plates having pressure communicating passages extending therethrough;
    layers of borosilicate glass interposed between said diaphragm and each of said support plates and extending over the entire surface of each of said support plates facing said diaphragm member to provide for electrical isolation and bonding between said diaphragm and said support plates, said layers being as thin as possible consistent with the requiredd isolation and bonding and thick enough to avoid excessive stray capacitance;
    a metallized region deposited on the glass layered surface of each of said plates opposite the deflecting portion of said diaphragm to act as the fixed electrodes of said transducer;
    a silicon stub having a pressure transmitting passage therethrough and joined at one end to said transducer by anodic bonding, said stub having its other end metallized; and
    an alloy tube which is long with respect to said stub and has a reduced diameter at one end fitted into the passage of said stub and soldered thereto, said tube being welded to a body portion of said transducer and being of material such that its thermal expansion coefficient and its Young's modulus are close to that of silicon.

4. A transducer as set forth in claim 3 in which:
    said alloy tube has approximately 54% iron, 28% nickel, and 18% cobalt; and
    the reduced end of said tube has a minimum diameter consistent with strength requirements.

5. A means for mounting to a body portion of a transducer assembly a pressure transducer having a silicon diaphragm bonded to a silicon plate, comprising:
    a silicon stub having a pressure transmitting passage therethrough, said stub being joined at one end to said plate by anodic bonding; and
    an alloy tube which is long with respect to said stub and has a reduced diameter at one end fitted into the passage of said stub and bonded thereto so that said tube can be welded to said body portion, said tube being of material such that its thermal expansion coefficient and its Young's modulus are close to that of silicon.

6. A mounting means as set forth in claim 5 in which:
    said plate has a thin layer of borosilicate glass between it and said stub to provide for said anodic bonding;
    said tube is constructed of an alloy having approximately 54% iron, 28% nickel, and 18% cobalt; and
    the reduced end of said tube has a minimum diameter consistent with strength requirements.

* * * * *